United States Patent
Duggleby

(10) Patent No.: US 11,982,250 B2
(45) Date of Patent: May 14, 2024

(54) TRIPROPELLANT ROTATING DETONATION ROCKET ENGINE SYSTEMS

(71) Applicant: Venus Aerospace Corp., Houston, TX (US)

(72) Inventor: Andrew Thomas Duggleby, Friendswood, TX (US)

(73) Assignee: Venus Aerospace Corp., Houston, TX (US)

( * ) Notice: Subject to any disclaimer, the term of this patent is extended or adjusted under 35 U.S.C. 154(b) by 0 days.

(21) Appl. No.: 17/561,623

(22) Filed: Dec. 23, 2021

(65) Prior Publication Data

US 2022/0205412 A1 Jun. 30, 2022

Related U.S. Application Data

(60) Provisional application No. 63/130,584, filed on Dec. 24, 2020.

(51) Int. Cl.
*F02K 9/64* (2006.01)
(52) U.S. Cl.
CPC ..................................... *F02K 9/64* (2013.01)
(58) Field of Classification Search
CPC ..................... F02K 9/52; F02K 9/64
See application file for complete search history.

(56) References Cited

U.S. PATENT DOCUMENTS

| | | | | |
|---|---|---|---|---|
| 3,581,495 A * | 6/1971 | Kah, Jr. | .................... | F02K 9/52 60/742 |
| 3,588,298 A * | 6/1971 | Edwards | ................... | F02C 5/10 60/39.77 |
| 3,611,722 A * | 10/1971 | Shick | ........................ | F02K 9/52 239/425 |
| 4,097,820 A * | 6/1978 | Hill | ....................... | H01S 3/0953 372/90 |
| 4,220,001 A * | 9/1980 | Beichel | ..................... | F02K 9/76 60/260 |
| 6,185,927 B1 * | 2/2001 | Chrones | .................... | F02K 9/52 239/428 |
| 2017/0146244 A1 * | 5/2017 | Kurosaka | .................. | F23R 3/10 |
| 2018/0038316 A1 * | 2/2018 | Balepin | ..................... | F02K 9/64 |
| 2018/0231256 A1 * | 8/2018 | Pal | ............................ | F02C 5/02 |
| 2020/0149743 A1 * | 5/2020 | Singh | ........................ | F23R 3/50 |
| 2021/0108801 A1 * | 4/2021 | Singh | ..................... | F23R 3/002 |

* cited by examiner

*Primary Examiner* — Lorne E Meade
(74) *Attorney, Agent, or Firm* — Osha Bergman Watanabe & Burton LLP

(57) ABSTRACT

A rocket engine comprising a rotating detonation rocket engine and three propellants. The propellants comprise of at least one of an oxidizer and at least one fuel. A third propellant, a fuel, oxidizer or inert fluid, may be injected to control the detonation characteristics. The rocket engine may further include wan additional rocket engine wherein a pump provides pressure for multiple engines. The rocket engine may further include multiple turbopump shafts for independent control of the propellants.

8 Claims, 2 Drawing Sheets

TRIPROPELLANT ROTATING DETONATION ROCKET ENGINE SYSTEMS

CROSS-REFERENCE TO RELATED APPLICATIONS

This application claims priority to and the benefit of provisional patent application No. 63/130,584 filed 2020 Dec. 24 by the present inventor, which are incorporated by reference in their entirety.

FEDERALLY SPONSORED RESEARCH

Non applicable.

BACKGROUND

The present invention relates generally to rockets and rocket engines. More specifically, the present invention relates to improved rotating detonation rocket engine with three propellants for improved performance and lifetime.

The Applicant is unaware of inventions or patents, taken either singly or in combination, which are seen to describe the embodiments as claimed.

In rotating detonation rocket engines, the combustion chamber is arranged as an annulus allowing the detonation wave(s) to travel circumferentially while propellants are injected axially. Before the detonation wave front reacts the propellants the mixed propellants often start combusting but at constant pressure (deflagration). To maximize performance, the deflagration must be minimized such that all combustion occurs as detonation.

SUMMARY OF INVENTION

The present invention relates to rotating detonation rocket engines. Three propellants are used. In one embodiment, the propellants include a fuel source and an oxidizer source. A third propellant acts as a coolant and could be another fuel, another oxidizer, or an inert fluid, such as water. Rotating detonation rocket engines achieve higher efficiency than prior art rocket engines by reacting the fuel(s) and oxidizer(s) in a constant-volume reaction resulting in a higher pressure and temperature gain. Distinct from prior art rotating detonation rocket engines, the current invention separates the injection of the main fuel and main oxidizer by a third propellant to suppress parasitic deflagration.

One embodiment of the rocket engine comprises an inert coolant as a third propellant with a propellant pressurizing system with a propellant pressurizing source, a heat exchanger, and the pressurization source driven by the coolant after it passes through the rocket engine and heat exchanger, such as in an expander cycle. An embodiment of an injection system comprises three concentric channels. The innerchannel is for the oxidizer, the middle channel is for the coolant, and the outer channel is for the fuel. In this ebodiment, the amount of coolant may be adjusted to minimize parasitic deflagration. In another embodiment, this order of contents of the three channels is reversed, so that the inner channel is for the fuel, the middle channel is for the coolant, and the outer channel is for the oxidizer.

BRIEF DESCRIPTION OF THE FIGURES

These and other characteristics of the present invention will be more fully understood by reference to the following detailed description in conjunction with the attached drawings, in which.

DETAILED DESCRIPTION OF THE INVENTION

Scenarios and options are non-limiting embodiments.

Figure 1:
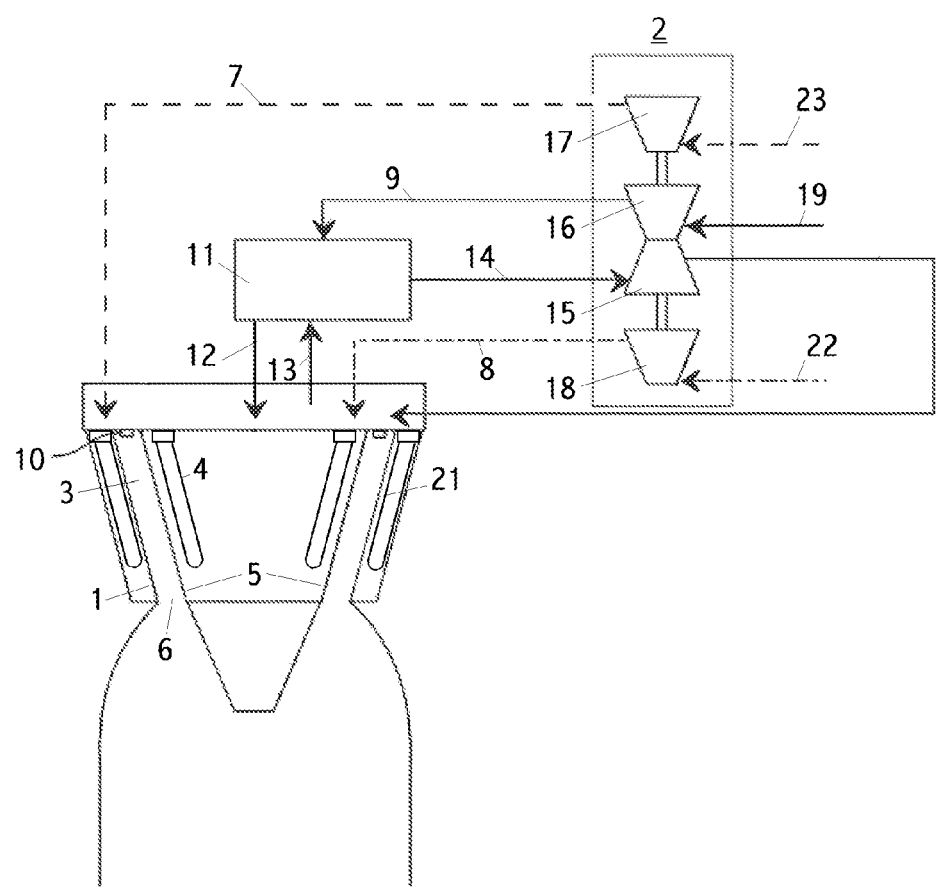
FIG. 1 is a schematic view with an inert coolant as a third propellant, showing a coolant source, fuel source, oxidizer source, pressurization system, and heat exchanger.

FIG. 1 is a schematic view of one embodiment of a rotating detonation rocket engine with an inert coolant as a third propellant showing a coolant source, fuel source, oxidizer source, pressurization system, heat exchanger. In other embodiments, the coolant may be another fuel or another oxidizer. Embodiments may use the heat exchanger as a heater.

The rotating detonation rocket engine uses propellant that comprises a fuel source stored in the vehicle and delivered to the engine via the fuel feedline 23, an oxidizer source stored in the vehicle and delivered to the engine via the oxidizer feedline 22, and a coolant source stored in the vehicle and delivered to the engine via the coolant feedline 19. The three feedlines 23, 22 and 19 are in fluidic communication with a pressurization system 2 comprising a turbine 15, coolant pump 16, fuel pump 17, and oxidizer pump 18. The coolant pump 16 is in communication with a heat exchanger 11 via a high-pressure coolant line 9. The fuel pump 17 is in communication with the injector 10 through a fuel high-pressure fuel line 7. The oxidizer pump 18 is in communication with the injector 10 through a high-pressure oxidizer line 8.

In one embodiment, the coolant temperature and pressure is increased in the heat exchanger 11 to a supercritical state and then is in fluidic communication with the rocket engine via the heat exchanger outlet line 12. In other embodiments, the coolant temperature is increased in the heat exchanger 11 to below a supercritical state.

Figure 2:
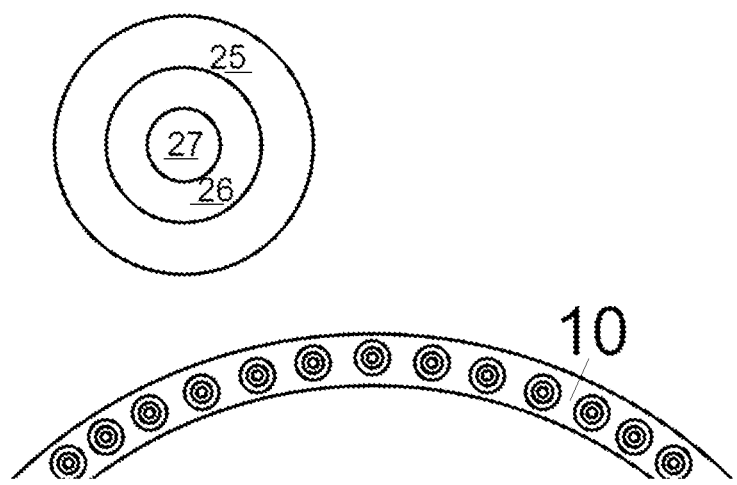
FIG. 2 shows a schematic axial view of an injector.

An inner-cowl 5 is cooled by internal coolant channels 4 that are in fluidic communication with the heat exchanger coolant outlet line 12 and the hot coolant return line 13. The hot coolant, after exchanging heat with the incoming coolant, exits the heat exchanger 11 and enters the coolant turbine 15 via a hot coolant heat exchanger outlet 14. After the coolant provides the power for the pressurization system, the coolant enters the outer cowl 1 via internal coolant channel 21. The internal coolant channel 21 cools the outer cowl 1 and is in fluidic communication with the injector 10. The injector 10 injects the fuel, coolant, and oxidizer into the combustion annulus 3 where the detonation is established and exits at the throat 6. A schematic axial view of the injector is shown in FIG. 2. The internal coolant channels 4 and 21 are integrated into the rocket engine via manifolds and passages as those skilled in the art know.

Figure one uses dot-dashed lines to indicate oxidizer flow and dashed lines to indicate fuel flow.

Referring now to FIG. 2, and embodiment of the rotating detonation rocket engine shows the axial, or end-on, view of the injector 10 with multiple ports arranged around the annulus with concentric outlets. The oxidizer outlet 27 is in the center, the coolant outlet in the middle outlet 26, and the fuel outlet in the outer outlet 25. It will be apparent to those skilled in the art that oxidizer and fuel may be switched to opposite outlets, and also that other reactive propellants may be used in place of oxidizer and fuel.

Conclusion, Ramifications and Scope

The separation of the oxidizer and fuel by the coolant serves to delay the mixing of the fuel and oxidizer thus minimizing the parasitic deflagration, which is a key step in both establishing a rotating detonation, increasing the efficiency of detonation combustion and increasing rocket engine lifetime.

In some embodiments a rocket engine system is equivalent to a rocket engine.

Ideal, Ideally, Optimal and Preferred— Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample or exemplary embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature— Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements and limitations of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification, abstract, and drawings. Embodiments of the methods of invention explicitly include all combinations of dependent method claim steps, in any functional order. Embodiments of the methods of invention explicitly include, when referencing any device claim or limitation thereof, to any and all other device claims, including all combinations of elements in device claims. Claims for devices and systems may be restricted to perform only the methods of embodiments or claims.

What is claimed is:

1. A rocket engine comprising:
an annular combustion section comprising outer and inner walls, one or more of the walls comprising one or more cooling passages therein;
a first propellant source;
a second propellant source;
a coolant source comprising a coolant;
a heater adapted to heat the coolant to a supercritical state;
a plurality of injection ports arranged around the annular combustion section, each injection port comprising an inner outlet, a middle outlet, and an outer outlet, wherein said plurality of injection ports are arranged concentrically about said annular combustion section;
wherein the first propellant source and the second propellant source are fluidically coupled to the inner outlet and the outer outlet, respectively, of said plurality of injection ports;
wherein said coolant is water;
wherein the coolant source is fluidically coupled to the heater and the heater is fluidically coupled to the one or more cooling passages; and
wherein the heater and the one or more cooling passages are fluidically coupled to the middle outlet, wherein said coolant source is configured to supply coolant to said middle outlet such that when said first propellant, said second propellant and said coolant are concurrently injected into said annular combustion section, said coolant separates said first propellant from said second propellant to minimize parasitic deflagration.

2. The rocket engine of claim 1 wherein:
said coolant source provides said coolant to said middle outlet at a temperature and a pressure wherein at least one of the temperature and the pressure are within ten percent of a temperature and a pressure at which the coolant becomes supercritical.

3. A rocket engine comprising:
an annular combustion section comprising outer and inner walls, one or more of the walls comprising one or more cooling passages therein;
a fuel source;
an oxidizer source;
a coolant source comprising a coolant;
a heater adapted to heat the coolant to a supercritical state;
a plurality of injection ports arranged around the annular combustion section, each injection port comprising an inner outlet, a middle outlet, and an outer outlet, wherein said plurality of injection ports are arranged concentrically about said annular combustion section;
wherein said fuel source is fluidically coupled to the outer outlet;
wherein said oxidizer source is fluidically coupled to the inner outlet;
wherein said coolant is water;
wherein the coolant source is fluidically coupled to the heater and the heater is fluidically coupled to the one or more cooling passages; and
wherein the heater and the one or more cooling passages are fluidically coupled to the middle outlet, wherein said coolant source provides coolant to said middle outlet such that when said fuel source, said oxidizer source and said coolant are concurrently injected into said annular combustion section, said coolant separates said fuel source from said oxidizer source to minimize parasitic deflagration.

4. The rocket engine of claim 3 wherein:
said heater is configured to provide said coolant at a temperature and a pressure wherein at least one of the temperature and the pressure are within ten percent of a temperature and a pressure at which the coolant becomes supercritical.

5. An injection port configuration for a rotating detonation rocket engine, said injection port configuration comprising:
a plurality of injection ports arranged around an annular combustion section, each of said plurality of injection ports comprising an inner outlet, a middle outlet, and an outer outlet, wherein said plurality of injection ports are arranged concentrically about said annular combustion section;
said outer outlet fluidically coupled to a fuel source;
said inner outlet fluidically coupled to an oxidizer source;
said middle outlet configured to be fluidically coupled to a coolant source such that during operation of said rotating detonation rocket engine, said middle outlet delivers a coolant between said inner outlet and said outer outlet such that when said fuel source, said oxidizer source and said coolant are concurrently injected into said annular combustion section, said coolant separates said fuel source from said oxidizer source to minimize parasitic deflagration, and wherein said coolant is water.

6. The injection port configuration of claim 5 wherein said middle outlet is configured to deliver said coolant between said inner outlet and said outer outlet at a temperature and a pressure wherein at least one of the temperature and the pressure are below a temperature and a pressure at which the coolant becomes supercritical.

7. An injection port configuration for a rotating detonation rocket engine, said injection port configuration comprising:
   a plurality of injection ports arranged around an annular combustion section, each of said plurality of injection ports comprising an inner outlet, a middle outlet, and an outer outlet, wherein said plurality of injection ports are arranged concentrically about said annular combustion section;
   said middle outlet is configured to be fluidically coupled to a coolant source; and
   said inner outlet fluidically coupled to a fuel source and said outer outlet coupled to an oxidizer source such that during operation of said rotating detonation rocket engine, separation of an oxidizer and a fuel by a coolant delays mixing of the fuel and the oxidizer to minimize parasitic deflagration, wherein said coolant is water.

8. The injection port configuration of claim 7 wherein said middle outlet is configured to deliver said coolant between said inner outlet and said outer outlet at a temperature and a pressure wherein at least one of the temperature and the pressure are below a temperature and a pressure at which the coolant becomes supercritical.

\* \* \* \* \*